Jan. 19, 1943.  W. H. GREENLEAF  2,308,874
SCALE
Filed Dec. 18, 1940
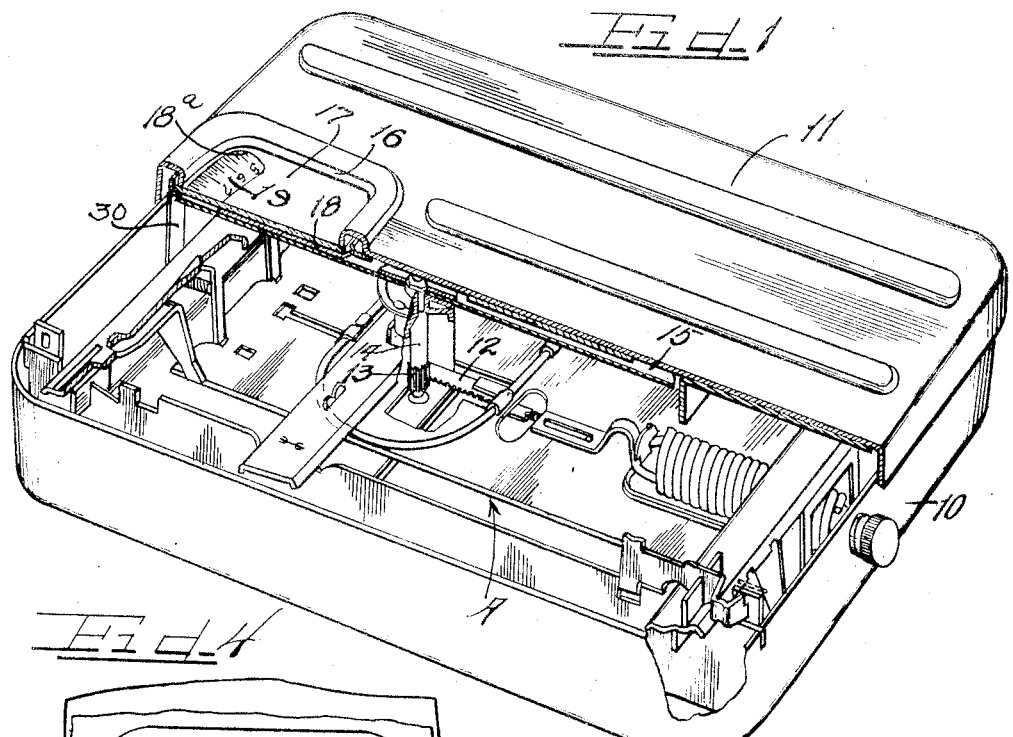
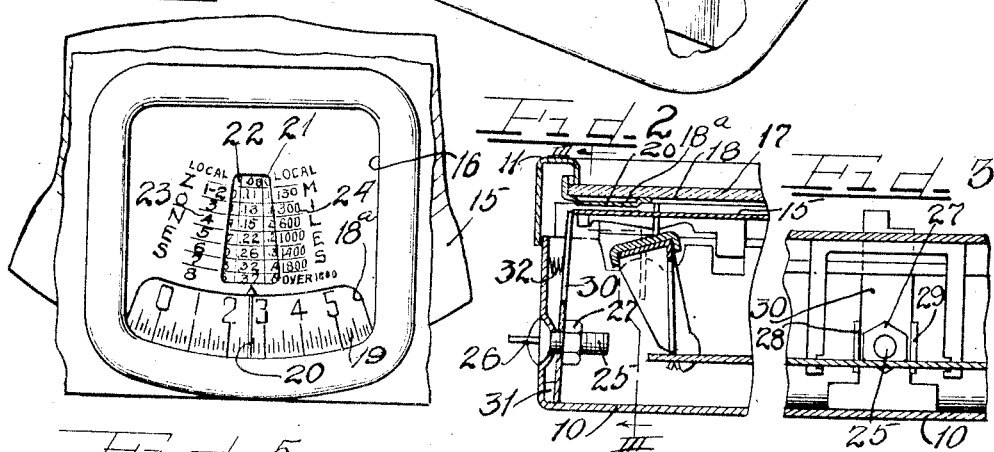
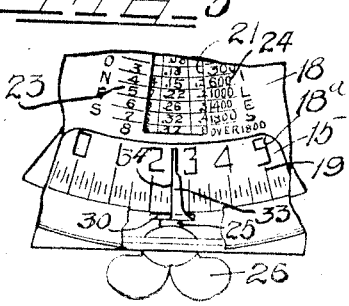
Inventor
William H Greenleaf
by Charles H. Wills
Attys.

Patented Jan. 19, 1943

2,308,874

UNITED STATES PATENT OFFICE 2,308,874

SCALE

William H. Greenleaf, Chicago, Ill.

Application December 18, 1940, Serial No. 370,629

6 Claims. (Cl. 265—68)

The present invention relates in general to a weighing scale and is more particularly concerned with scales of the portable type such as may be used in the home, in offices for weighing mail, parcel post, etc., and many other places where an exceedingly compact and extremely accurate scale may be desired. A scale of this type is disclosed in my copending application United States Serial No. 105,876 which has matured into Patent No. 2,228,874, of which the present application constitutes a continuation-in-part.

A primary object of the present invention is to provide a scale of such construction that it will withstand the rigors of shipment and rough handling without impairment of its ability to weigh accurately.

A further object of the invention is to provide in a scale of this type novel means for locking the weight indicator in indicating position, thus enabling the weight of an object to be read after the object is removed from the scale.

A still further object of the invention is to provide an improved scale which may be utilized in the normal manner for weighing articles, and which may in addition be utilized for weighing mail, parcel post and the like, novel means being provided to indicate the postage required for different zones.

Yet another object of the herein described invention is to provide an improved locus or index pointer for scales of the herein described type.

Other objects and features of the invention will more fully appear from the following detailed description taken in connection with the following drawing which illustrates a single embodiment thereof, and in which:

Figure 1 is an isometric view of a scale embodying the features of the herein described invention, a section being taken through the scale platform and certain portions being cut away to disclose the operative relationship of the scale parts;

Figure 2 is a fragmentary longitudinal section through the windowed end of the scale to show details of the dial locking mechanism;

Figure 3 is an enlarged fragmentary transverse section at this end of the scale, the scale platform being removed, taken substantially on line III—III of Figure 2;

Figure 4 is an enlarged fragmentary plan view of a section of the platform, showing the viewing window therein and details of the arrangement of weight and cost of postage indicating indicia; and Figure 5 is an enlarged fragmentary partial plan view of the viewing window portion of the scale, certain portions being cut away to show details of an alternative arrangement for the index pointer.

As shown on the drawing:

Referring to the drawing, a scale embodying the present invention is illustrated in Figure 1. In general, the disclosed embodiment comprises a substantially rectangular casing 10 which is provided with a platform or cover 11 of such size as to permit free vertical movement of the platform independent of the case under the weight of an object placed thereon to be weighed. The case and platform cooperate to form a housing in which a scale mechanism as generally indicated at A is enclosed.

The scale mechanism for transmitting movements of the platform to the weight indicating part of the scale may be of any suitable construction, but it is preferred that this construction be such as that which is described in detail in my copending application Serial No. 105,876.

The motion transmitting mechanism, as disclosed in Figure 1, includes a reciprocable rack 12 which forms a part of the motion transmitting mechanism. This rack meshes with a pinion 13 carried by a vertically disposed arbor 14 mounted in suitable bearings for rotation. The arbor 14 is fixed as to its position within the casing 10 and has secured to its uppermost end for rotation therewith a dial plate 15 of disk-like construction and having its surface area extending in substantial parallel relation to the plane of the platform.

The dial plate is disposed beneath the platform a sufficient distance to prevent its being engaged by the platform, when the platform is moved to its lowermost position under the weight of an object to be weighed, or otherwise.

The platform 11 is provided adjacent one end with a window portion 16 having a glass plate 17 supported therein in any suitable manner. This glass plate overlies an inner plate member 18 which overlies a peripheral marginal portion of the upper surface of the dial plate, the member 18 being provided with an arcuate opening 18a only, where the scale is to be utilized merely for obtaining the weight of objects. For such purposes, the dial plate is provided on its upper surface peripheral margin with a suitable scale 19 having circumferentially spaced graduations and weight indicating indicia thereon.

Intermediate the ends of the arcuate opening 18a there is provided a transversely extending strip portion 20 which may be integrally formed with the plate 17. This strip defines a locus line which through its cooperation with the graduations of the scale 19 will indicate the weight of an object placed on the platform, the graduations of the scale being adapted to be aligned and brought into registration with the strip 20. A graduation so aligned would indicate the weight of the object.

When the scale is to be utilized for the additional purpose of weighing mail, parcel post, or the like, the plate 17 is preferably provided with an additional opening 21 which extends in a direction radially of the dial plate 15. On the portion of the dial plate movable under the opening 21 there is in this case provided an additional scale 22 containing groups of numerals which are radially as well as circumferentially spaced on the dial face, these numerals representing the amount of postage necessary for different zones or for different mileage distances. Zone-indicating indicia 23 are disposed along one side of the opening 21 whereas corresponding mileage indicating indicia as shown at 24 may be disposed along the opposite side of the opening 21. In this construction, the plate 17 forms a dial carried by the platform which cooperates through the opening 21 with the scale 22 on the dial plate to determine the amount of postage required for an object of a specific weight for the different zonal distances, and the member 20 cooperates with both the scales 19 and 22 during the weighing and computing operation.

It has been found desirable in some instances in scales of this type, particularly in a scale for use in weighing parcel post, to provide means for locking the weight indicating mechanism in indicating position, so that when the object is removed, the weight may still be determined. This is especially true in the case of weighing large packages which would cover up the window 16 in the platform and prevent reading the indicated weight and the amount of postage necessary.

For this purpose, a novel dial locking arrangement is provided. Below the window 16, there is arranged a screw 25 having its shank extending through the case 10 and its head disposed outside the case, the end of the screw being provided with a wing 26 by means of which the screw may be turned through a partial revolution. Within the case, there is threadedly associated with the shank of the screw a nut 27 which is retained against rotative movement by lateral or side flanges 28 and 29 formed on a rockingly supported member 30.

The shank of this screw extends through a suitable aperture intermediate the ends of the member 30. The lowermost end of this member is laterally extended in opposite directions and deflected to form spaced rockers, one of which is shown at 31, upon which the member 30 may be pivoted. The member 30 is disposed between the nut 27 and the associated wall of the case, and a spring 32 placed adjacent the free end of the member to normally force it in a direction holding it in engagement with the nut 27. The uppermost end of the member 30 is arranged so as to be movable into and out of engagement with the peripheral edge of the dial 15, when the screw is turned by means of the wing 26.

Assuming, therefore, that an object has been placed on the platform and it is desired to lock the dial in weight indicating position, the wing 26 is rotated to such a position as to bring the free end of member 30 against the dial, whereby the dial is frictionally held against movement. If the object is now removed from the platform, the weight indicating parts will be retained in indicating position, thus enabling the weight and determination of the amount of postage required, after the object has been removed from the platform.

As an alternative construction to the provision of member 20 to form a locus line or index, there is shown in Figure 5 an arrangement wherein the member 30 is provided with a right-angled deflected portion 33 having a straight edge 34 with which the graduations on the scale 19 may be aligned. It will be noted that the portion 33 extends across the opening 18 in a manner similar to the member 20, and that the free end of the member 33 is made relatively narrow so as to serve as a pointer with which the various brackets of numerals on the scale 22 are to be aligned.

From the foregoing description, it will be apparent that the present invention provides a novel scale construction that will withstand rigorous treatment without impairment of its weighing accuracy; which has novel means for locking the weight indicator so that the weight of an object may be read after the object is removed from the scale; which may be utilized in the normal manner for weighing articles, and in addition may be utilized for weighing mail, parcel post and the like, novel means being provided to indicate the postage required for different zones; and which embodies an improved mounting arrangement for the locus or index pointer.

Now, it is of course to be understood that although I have described in detail the preferred embodiment of my invention, the invention is not to be thus limited, but only in so far as defined by the scope and spirit of the appended claims.

I claim as my invention:

1. In a weighing scale, a rotatable weight indicating dial plate, a pivotally mounted lever adapted at its free end to engage and disengage said plate, a digital member operable to move the lever, and spring means for normally forcing the lever towards a position engaging the dial, said spring being disposed to exert pressure on said lever at a point away from its free end and away from the pivot mounting.

2. In a weighing scale, a rotatable dial plate having weight indicating indicia thereon, a brake member mounted for movement into and out of engagement with the dial plate, and a pointer carried by said member cooperable with said indicia to indicate the weight of an object being weighed.

3. In a weighing device, a weighing platform supported for vertical movements and having spaced openings therein, a rotatable dial plate below said platform and responsive to the platform movements, a graduated scale bearing indicia carried by the platform, a graduated scale bearing indicia carried by the dial plate, said scales being cooperable through one of said openings for selectively indicating for the indicia of the first scale indicia of the second scale as varied in response to movements of the dial plate, another graduated scale carried by said plate visible in part through the other of said openings, and locking means for locking the device in a weighing position, said means including a member defining an index locus operatively associated with said scales.

4. In a weighing scale having a casing and weight indicating mechanism including an indicator mounted for movement relative to said casing in response to the application of weight to the scale, means for releasably locking the indicator against movement, said means including a member constructed and arranged to move pivotally about a point substantially at one end thereof and having the remote end thereof engageable against the edge of said indicator, spring means engaging said member at a point out of the plane of the edge of said indicator for urging the same against said edge and means for manually withdrawing and retaining said member away from said edge against the action of said spring at the will of the operator.

5. In a weighing scale having a casing and weight indicating mechanism including an indicator mounted for movement relative to said casing in response to the application of weight to the scale, means for releasably locking the indicator against movement, said means including an arm disposed in a plane extending at a substantial right angle to the plane through the indicator, said arm being constructed and arranged to swing pivotally about a point substantially at one end thereof and having the remote end engageable against the edge of said indicator, spring means engaging the arm at a point thereof out of the plane through the edge of the indicator for urging the same against said edge and means for manually withdrawing and maintaining said member away from said edge against the action of said spring at the will of the operator.

6. In a weighing scale, a weight indicating mechanism including a movable weight indicator, means for releasably locking said mechanism in weight indicating position including a lever disposed substantially at a right angle to the plane through the indicator, a pivot for mounting said lever for movement into edge engagement with said indicator and away therefrom, said pivot engaging said lever at a portion thereof out of the plane of said indicator and a spring member for urging said lever towards said indicator, said spring member engaging said lever at a point thereon removed from the portion engaged by said pivot.

WILLIAM H. GREENLEAF.